(12) United States Patent
Farris

(10) Patent No.: US 9,943,064 B2
(45) Date of Patent: Apr. 17, 2018

(54) WATER DISPENSER FOR CATS WITH ACCESSORIES

(71) Applicant: Barry Farris, Pollock Pines, CA (US)

(72) Inventor: Barry Farris, Pollock Pines, CA (US)

( * ) Notice: Subject to any disclaimer, the term of this patent is extended or adjusted under 35 U.S.C. 154(b) by 673 days.

(21) Appl. No.: 14/120,850

(22) Filed: Jul. 2, 2014

(65) Prior Publication Data

US 2016/0000038 A1 Jan. 7, 2016

(51) Int. Cl.
*A01K 7/00* (2006.01)
*A01K 7/02* (2006.01)

(52) U.S. Cl.
CPC ............... *A01K 7/02* (2013.01); *A01K 7/027* (2013.01)

(58) Field of Classification Search
USPC ......... 119/72, 5, 73, 74, 76, 77, 51.5, 61.52, 119/454, 456, 464, 475, 515, 521; D30/121, 129, 132, 133
See application file for complete search history.

(56) References Cited

U.S. PATENT DOCUMENTS

| | | | | |
|---|---|---|---|---|
| 1,926,481 A | * | 9/1933 | Fox | A47G 23/0633 206/562 |
| D109,750 S | * | 5/1938 | Werner | 119/77 |
| 2,792,975 A | * | 5/1957 | Yorker | B65D 47/18 222/498 |
| 4,090,647 A | * | 5/1978 | Dunning | G01F 11/082 222/543 |
| 4,573,434 A | * | 3/1986 | Gardner | A01K 7/02 119/77 |
| D335,197 S | * | 4/1993 | Strickland | D30/132 |
| 5,259,336 A | * | 11/1993 | Clark | A01K 7/00 119/51.5 |
| 5,409,145 A | * | 4/1995 | Payne | B65D 23/12 222/212 |
| D365,668 S | * | 12/1995 | Lorenzana | D30/121 |
| 5,544,489 A | * | 8/1996 | Moren | B67D 3/0009 165/299 |
| 5,799,609 A | * | 9/1998 | Burns | A01K 7/00 119/74 |
| 5,881,753 A | * | 3/1999 | Bowling | A01K 63/006 119/72 |
| 5,884,582 A | * | 3/1999 | Duckworth | A01K 7/00 119/51.5 |
| 6,971,331 B1 | * | 12/2005 | Rohrer | A01K 7/02 119/52.1 |
| D659,302 S | * | 5/2012 | Rose | D30/121 |
| D749,381 S | * | 2/2016 | Magri | D24/230 |

* cited by examiner

*Primary Examiner* — Andrea Valenti
(74) *Attorney, Agent, or Firm* — Mark C Jacobs

(57) ABSTRACT

A pet watering apparatus which can be refilled as water is removed by evaporation or by a thirsty animal, which apparatus has a vessel, overlaid by a platform having a base and at least one leg, which platform has at least 2 apertures therein of one size and a central smaller aperture therein. Disposed in one aperture is a bottle capable of holding water, having a modified Yorker cap thereon, disposed in an inverted position; the Yorker cap's spout having been cut off at about a 45 degree angle. A siphon filter may be disposed through the platform's central aperture to the vessel for connection to a pump to re-circulate water through the siphon for microbe removal. An optional water chiller may be deployed on the platform.

15 Claims, 8 Drawing Sheets

WATER DISPENSER FOR CATS WITH ACCESSORIES

RELATION TO OTHER APPLICATIONS

This application is a continuation in part of my parent application filed Jun. 30, 2011 and which bears Ser. No. 13/135,334, now abandoned.

BACKGROUND OF THE INVENTION

It is believed that the first pet fountain was a product called Kitty Kreek which was perhaps advertized as early as 1995. The initial basis for a pet fountain was to stimulate the water consumption by the animal by attracting a pet to the water supply with the sight and sound of falling water. While there is no evidence of falling water stimulating water consumption in nature, the advertizing claim did motivate pet owners to buy something for their beloved pet to replace a simple bowl of room temperature tap water. For a while, the most successful pet fountain was called The Drinkwell which operated on the premise of the purported preference of cats to drink water falling from a dripping or running household faucet. The inventors of the Drinkwell received U.S. Pat. No. 5,799,609, issued in September 1998 covering the concept of The restriction of causing the flow of the water to initially attract a pet and then cause a pet to drink was limited by the claims of the aforementioned '609 patent such that other manufacturers of pet products usually made their flow of water not to "free fall", but rather to be in constant contact with the materials used to manufacture the fountain and therefore not infringe the aforementioned US patent Thus the water was made to slide down a ramp rather than fall into a pet accessible container which was located below the elevated water area. The amount of flow for most fountain products was adjusted by placing a flow restrict or in front of the intake area of the pump which often caused an unacceptable amount of pump noise due to cavitation. No prior art product known to applicant provided any means of adjusting the direction of the flow or controlling the temperature.

A large number of pet fountains were sold in attempts to provide attractants that might cause a pet to drink more water. Due to consumer complaints, almost all fountains added a refill feature to their original design to offset the water lost to evaporation, spillage and consumption of the water by the pet. To date, most, if not all, refill designs were made of plastic which were very difficult to keep clean due to the porous nature of the plastics and the awkward and inaccessible angles within the refill containers. The construction manifestations employed to cause the water to flow from the refill container to the open container of the fountain caused many problems with water overflowing onto the floor because the moving part of the flow design would often become stuck in the open position due to the mechanism being damaged in the normal course of adding water to the refill container, or the mechanism becoming impaired due to water impurities such as calcium deposits or the buildup of algae, or the effect of cleaning measures such a chlorine bleach or heat. The customer feedback of these issues on various websites, caused many customers to throw out their fountains in just a few months to avoid these issues and the more serious dangers of slip and fall accidents, and the possible damage to expensive floors.

Other modes of chilling the water to below ambient temperature to increase the water consumption by cats, by adding ice cubes or by freezing the water within the refill container have been tried. The addition of ice cubes to reduce the water temperature usually has a limited and short term effect and is impractical when the owner works outside the home or takes a weekend trip or lives in a relatively warm climate such as much of California and the southwest. Freezing of the refill container was often found to damage the refill container as well as damage the flow restricting mechanism usually due to thermal properties differences in the two materials. Furthermore the replacement of the refill system could cost as much as the entire fountain, so owners tended to just dispose of the fountain.

Cats are very finicky animals. Cats for example will not put their head into a water container, no matter the temperature, if the container is sized such that the animal's whiskers touch the side of the container. Cats tend to avoid water supplies where spillage has occurred as cats do not like getting their feet wet. Some cats refuse to drink from algae polluted water, even if the temperature is acceptable. Diminished water consumption can result in cat dehydration and kidney disease.

When given the choice of cool dirty water versus clean warmer water, the cats usually will opt for the cool dirty water. One more fact, cats drink from the water surface, not down in the vessel housing the water.

While it was easily determined that the issues of mold and fungus could be avoided in the refill source, by the use of glass rather than plastic, this was the overcoming of but one of the issues.

All of these recited issues point to the need for a cool temperature refillable water source for cats that avoids spillage by having a suitable refill rate from the storage portion of the device to the drinking vessel, while avoiding fungus, mold and algae issues. This invention fills that need of the marketplace.

SUMMARY OF THE INVENTION

There are four key aspects to this invention. The two main portions of this invention are the inverted electrically non-conductive preferably U-shaped platform having a plurality of apertures or openings therein, coupled with the use of a ceramic water receiving vessel that fits fully or partially underneath the platform such that both can rest on the floor surface, be it wood, tile, linoleum or concrete as the case may be or modified for the pair to hang on a wall. The third portion of the invention is a sterilization capable refill system, while the fourth part is a means of maintaining the water temperature at one suitable to the liking of cats, that is, chilled to a temperature lower than ambient temperature.

Sometimes cats need medications, and delivery through their water supply is easier than forcing a pill down the animal's throat. Thus provision in the platform for ways to introduce medication and food supplements into the water supply was deemed beneficial, as well as providing for the re-supply of water from additional water storage bottles, which bottles are made from glass, not plastic, to inhibit mold and fungus.

A modified Yorker spout provides a quiet and safe method of adding water to the vessel while also reducing the noise level and preventing a potential overflow of the vessel serves as the third portion of the invention. A thermo-electric chiller generates cold via the Peltier effect, generates a flux between two dissimilar materials, and this cold is passed to the water in the vessel via the "Ice Probe" to chill the water. This phenomenon forms yet another aspect of the invention.

A hole in the platform can be utilized to anchor a siphon tube filled with charcoal or other filter media and having elbows at its opposite end disposed in the water vessels, to filter the water in the vessel. The platform can also be employed to retain the chiller, a pump and if desired a thermometer as well as liquid medicine bottles.

DESCRIPTION OF THE PREFERRED EMBODIMENT

Figure 1:
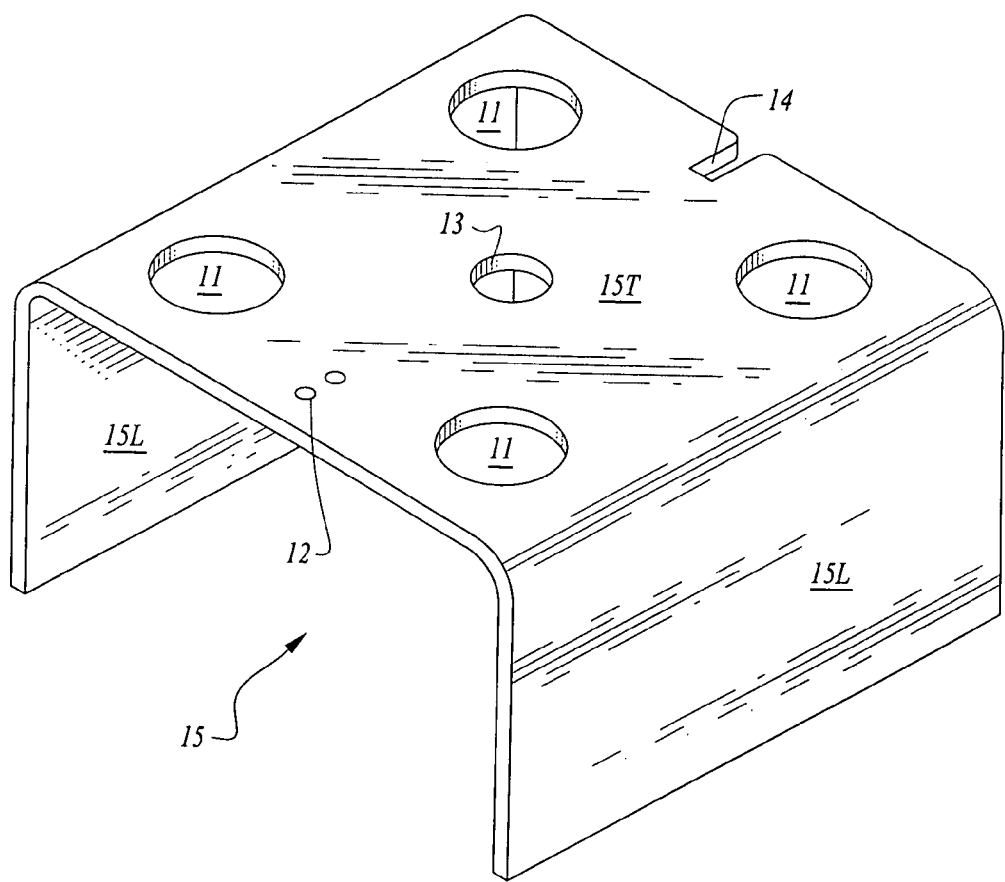
FIG. 1 is a perspective view of the platform portion of this invention.

The first embodiment shown in FIG. 1 comprises a free-standing platform structure 15 that supports various devices to clean, cool, sterilize and furnish replenishment water for a pet fountain. Platform 15 has an inverted U-shaped configuration, that is, a base and two legs with preferably rounded edges connecting the base or top 15-T with each of the two legs 15-L Also, seen in FIG. 1 is a series of holes apertures each numbered 11,—here 4 in number— one adjacent to each of the corners of the upper or top surface 15T, which holes have been cut or molded into the material that forms 15, an inverted U-shaped stand or platform. Found at the center of the platform 15 is a smaller aperture 13 whose purpose will be discussed later. Each aperture 11 can support one at a time many different accessories, such as but not limited to, a thermo-electric chiller such as one designated an Ice Probe™ chiller (sold by NovaTec of San Rafael, Calif.), a thermometer, an inverted water bottle with a special spout to be discussed infra, and additional refill water bottles and an ultra-violet water sterilizer. Another use for the apertures is as a pass trough for tubing.

Figure 2:
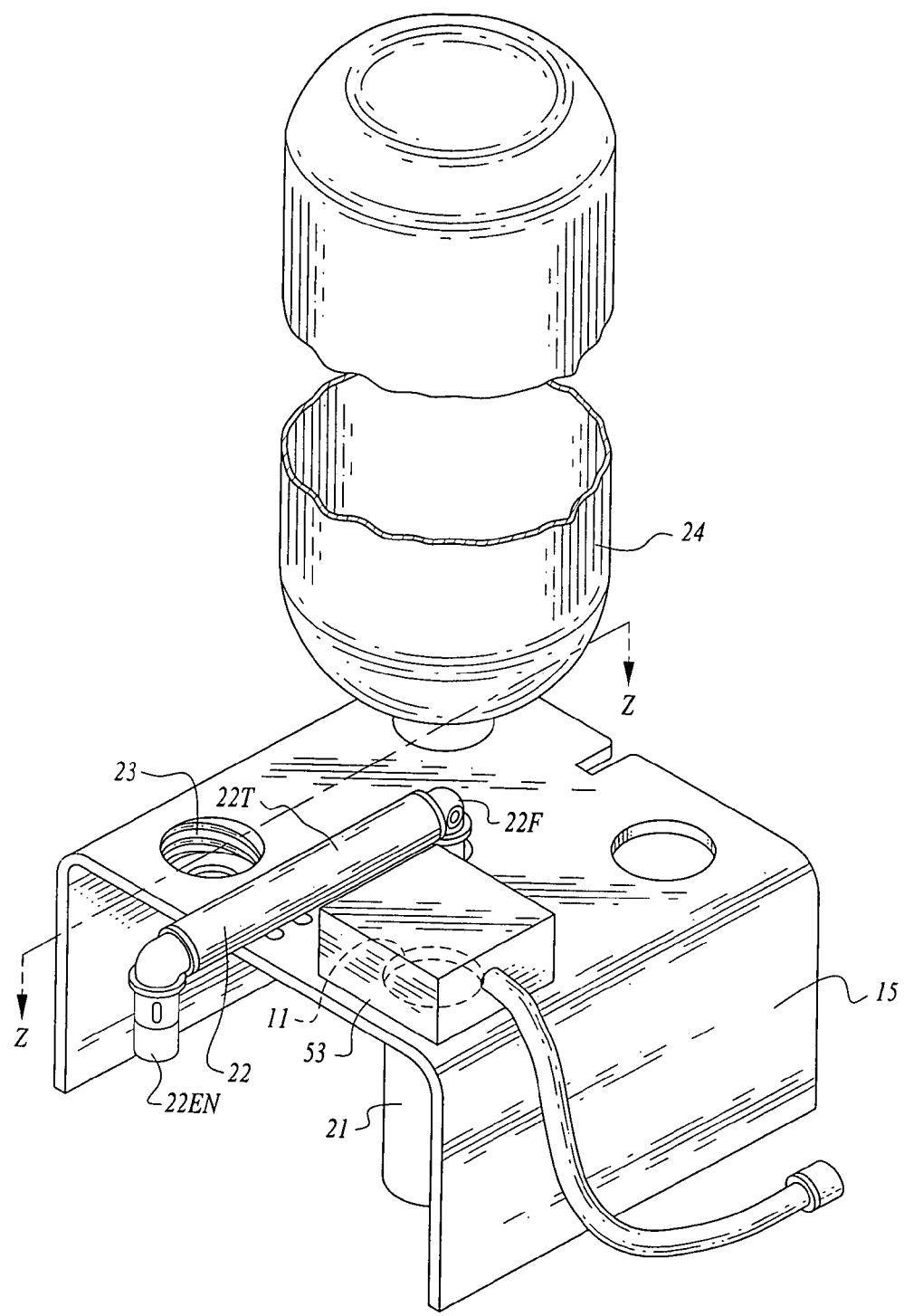
FIG. 2 is a perspective view of the inverted U-shaped base with a refill bottle, and a thermoelectric chiller, as well as a siphon system disposed thereon.

Also seen in the platform in FIG. 1 is a pair of small holes 12, that act as a retainer as, and which pair of holes is intended to retain a siphon tube filled with charcoal or other filtering media (not seen). Strapping material inserted through one of the many available apertures 120 and wrapped around the tube will maintain the filter tube's horizontal disposition in the vessel. Hole 25 is disposed near one of the non-bent edges of the top surface of the platform. FIG. 1 also shows the centrally disposed rear anchoring hole, 13 for the rear elbow 221 of the filter 22F which is seen in FIG. 2. Also shown in FIG. 1 is 14 which is preferably a slot or notch meant to anchor or restrict movement of an electrical cord such as from a submergible pump—not seen—which can be put into the water vessel. This slot 14 can also be used to retain ¼ inch tubing employed with other accessories. Platform 15 may be constructed of such materials as ABS plastic, polycarbonate, polyvinylchloride and stainless steel sheet stock among other materials having a thickness of 3/16 ths inches to about 5/16 ths inches or greater, but at much higher cost.

In FIG. 2, the platform 15 is seen with three items disposed thereon. The first is the optional thermo-electric chiller 20 to be referred to as the TEC disposed within one aperture, 11. The probe 21 of chiller 20 passes through the aperture 11 and rests in the water of whatever container is below the top of platform 15, though no vessel is shown in FIG. 2. The balance of the chiller rests on the platform. While chillers for aquariums and other water vessels may be available from a plurality of sources, excellent results have been obtained to keep pet water cool in the vessel 53, utilized as part of this invention, from the use of the aquarium chiller sold by Nova Tec of San Raphael, Calif. As noted in the company's literature, "the Aquarium Chiller 20 is a complete water cooling system. It includes the Ice Probe, 21, the nut and silicone washer for bulkhead installation, and a power converter (not shown for simplicity) with six foot cords on each side and can be easily installed in any orientation through a 1.25 inch hole." As noted earlier this operates based on the well known Peltier effect involving 2 dissimilar materials to create either heat or cold which is the absence of heat.

Also seen in FIG. 2 is a spout and cap combination, 23, commonly known as a Yorker cap and spout, and which is disposed and set into the leftward aperture 11. The cap and spout combination has been modified as shown as FIG. 4 and is fully seated in hole 11. Therefore the combination 23 is barely discernible.

Figure 8:
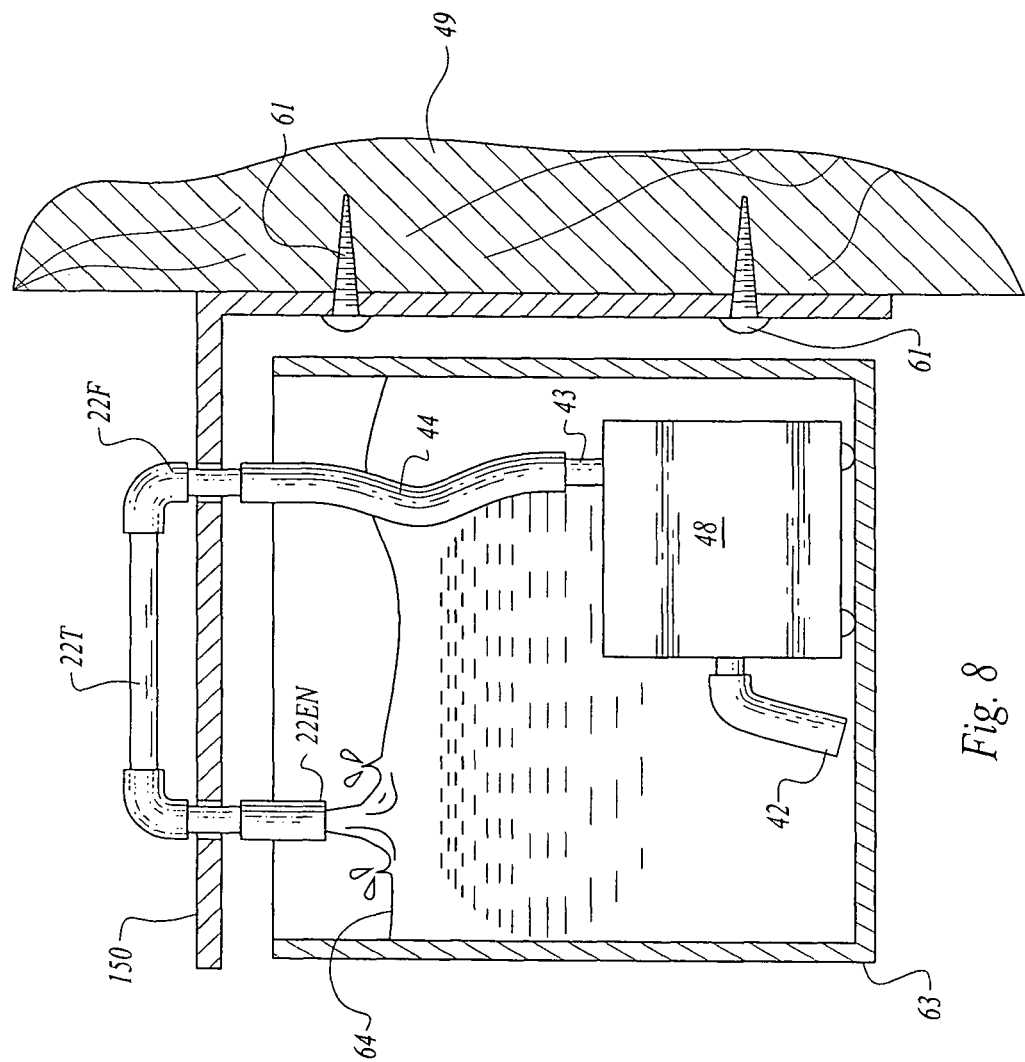
FIG. 8 is an end view of a cutaway vessel disposed under the variant platform and showing a submersible pump disposed within the vessel attached to the intake end of the horizontal filter and siphon.

In order to seat the cap and spout combination, the ribs of cap and spout 31 have been gently trimmed to forma very stable combination. To attempt to avoid any confusion, the cap and spout labeled as 23 is different from the cap and spout labeled as 31 in that the trimming and seating resulting from pushing of the element 31 into aperture 11, will slightly trim off the outermost edge of most if not all of the ribs in the undulating design that encircles the cap portion of the cap and spout 31. Reference is made to FIG. 8 for a side by side showing of the result of the trimming procedure carried out to yield a tight fit. Since the spout is internally threaded, a water bottle can be threadedly engaged thereto, such as bottle 24 seen adjacent thereto in a different aperture 11.

Also seen in FIG. 2 is a carbon filter which comprises a long tube and elbows on each end of the tube. The filter is designated 22, and is horizontally mounted on the top of platform 15 in central aperture 13. Filter 22 includes an elbow that is not fixed and is fully adjustable to any angle in one 360-degree plane and one elbow that is fixed for use in a vertically downward disposition. The elbows are designated 22-EN for non fixed and 22F for the fixed unit.

The siphon tube 22T is filled with granules of charcoal 27, and/or other filter material such as spun glass fibers or foam rubber. As noted the tube has an elbow at the distal end relative to the platform 15 that is adjustable from pointing straight up, for the maximum in noise and stream of water, to pointing straight down, for the quietest water noise and least potential for splashing, or at any angle in between or direction in a single plane of 360 degrees. The purpose of this filter is to remove microbes in the range of about 0.20 microns.

The water pump-employed with and as a part of the invention, not seen in this FIGURE is a conventional preferably submersible pump having an inlet and an outlet end, as is conventional. The inlet end takes up water from vessel 53 seen in FIG. 5 and forces the water through a silver impregnated or other inert material tube into the fixed elbow, 22F, at the back of the filter chamber. After the water is forced through the filter media that is inside the siphon tube 22T, th water falls back into the basin via the moveable elbow, 22EN, thereby completing a closed circuit.

Figure 3:
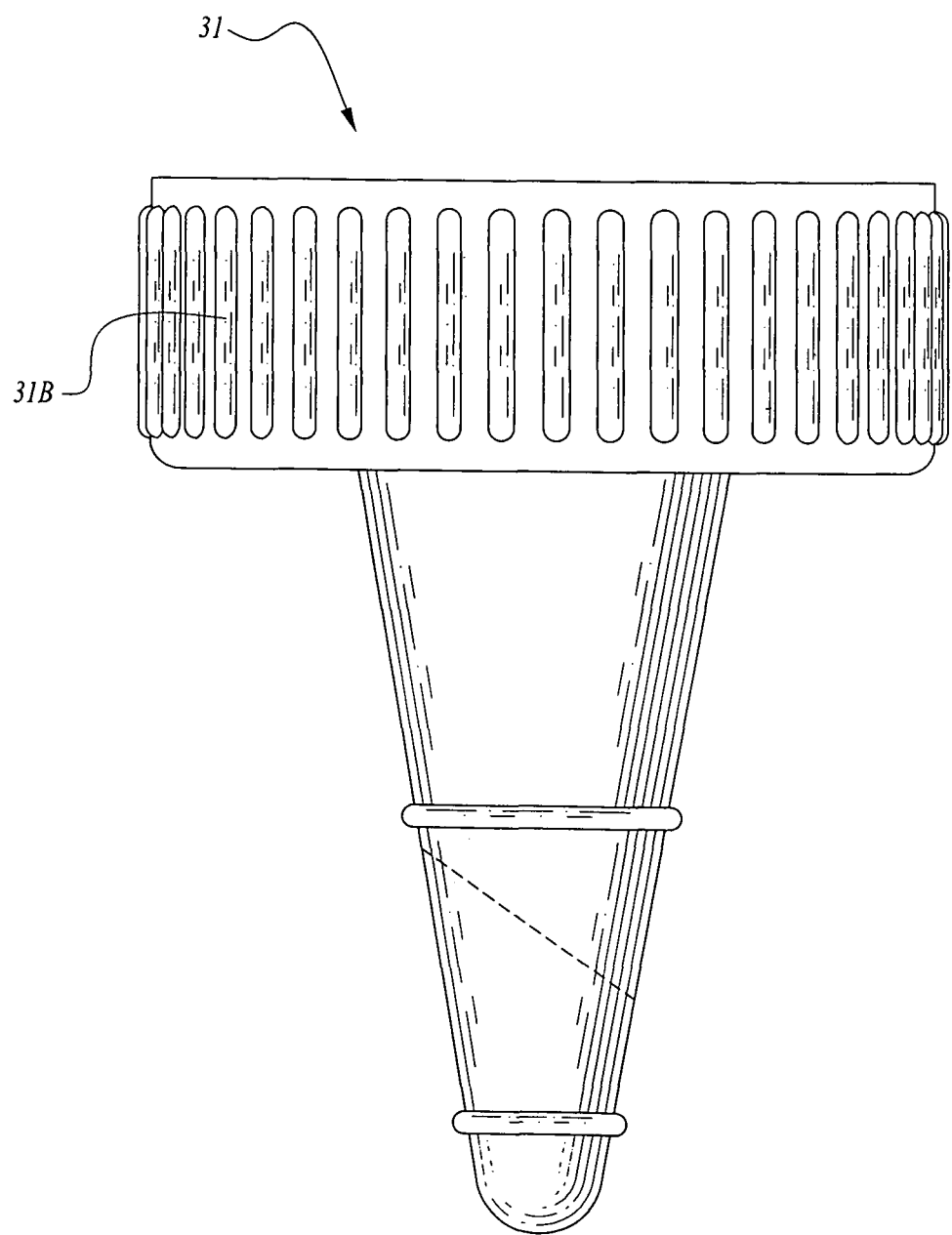
FIG. 3 is an elevational view of a Yorker spout prior to modification for this invention and FIG. 4 is an elevational view of the spout subsequent to modification for use in this invention.

The reader should now turn to FIG. 3. Here the original Yorker closure 31 which has ribs 31B, a spout and an integrated cap, unmodified is shown, right out of the box as received from Yorker Packaging. The dashed unnumbered diagonal line represents the line where a cut will be made to modify, the spout as shown elsewhere herein. Yorker spout caps dispense simply and effectively, and are used for a variety of dispensing needs from lubricating oil to barbecue sauce. While eleven cap sizes are available (ranging from 15M-8 to 38 mm), and are manufactured with standard hole sizes, and two sizes of sealer tips, I have found that good results are obtained for water delivery using a 28 mm cap with a 400 Finish and a size 0.30 hole size and the company's regular sealer tip and as such this is the preferred closure.

Note the vertical ribs present on the cap portion of the device, which is internally threaded, but which threads are not visible in this FIGURE. Bottles can engage the internal threads of the cap to provide a secure placement for the bottle to prevent tipping over and possible spillage. In other words, the bottle is held tightly in place.

Figure 4:
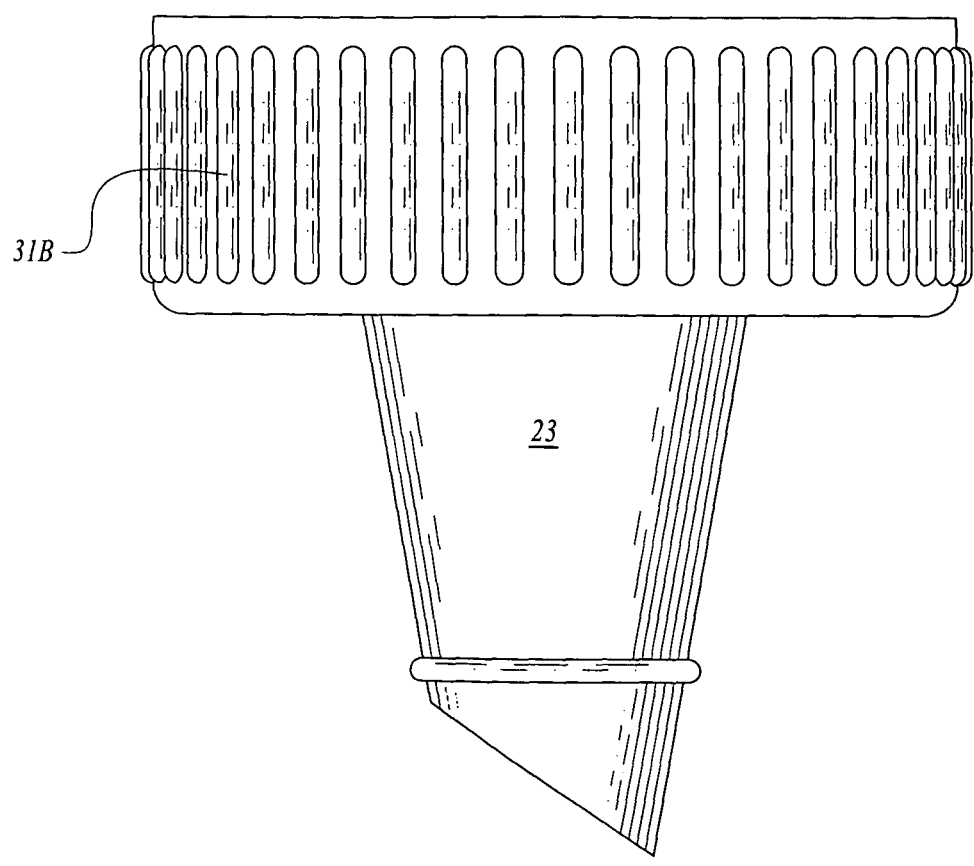

Turn now to FIG. 4. Here the spout or tip of the closure has been cut and renumbered to 23. The spout portion of the Yorker closure that is preferred for use is 1.45 inches long. Approximately 0.88 inches or about 61% of the spout measured from the cap section has been cut off at a 45 degree angle. The reason for the specific angular cut is that this angle prevents the overfilling of the water vessel when disposed beneath the platform 15, as well as quieting the noise of water leaving the bottle 24 into the vessel disposed below. The interesting phenomenon is that whether an 8 oz, 16 oz or 32 oz refill bottle is disposed in an aperture 11, what ever amount disappears from the vessel through evaporation or animal thirst, the same amount is replenished from the bottle, no matter the size of the refill bottle.

Spout 31 has a series of spaced vertical plastic ribs each of which has a diameter that is 0.03 inches larger than, the diameter of hole 11 whereby when the soft plastic such as polyethylene used to manufacture the closure is inserted into the hole 11, the rigid material used to manufacture platform 15, such as 3/16" ABS plastic, will actually trim down the raised portion of all of the ribs thus reducing their outward extension ever so slightly to provide a very tight frictional engagement of the ribs which retain the designation 31B, within the aperture 11. This shearing action of the edge of the aperture provides for a tight fit of the ribbed closure thereby providing stability for the glass or plastic bottle 24 filled with tap water, distilled water or therapeutic water for the animal.

Figure 5:
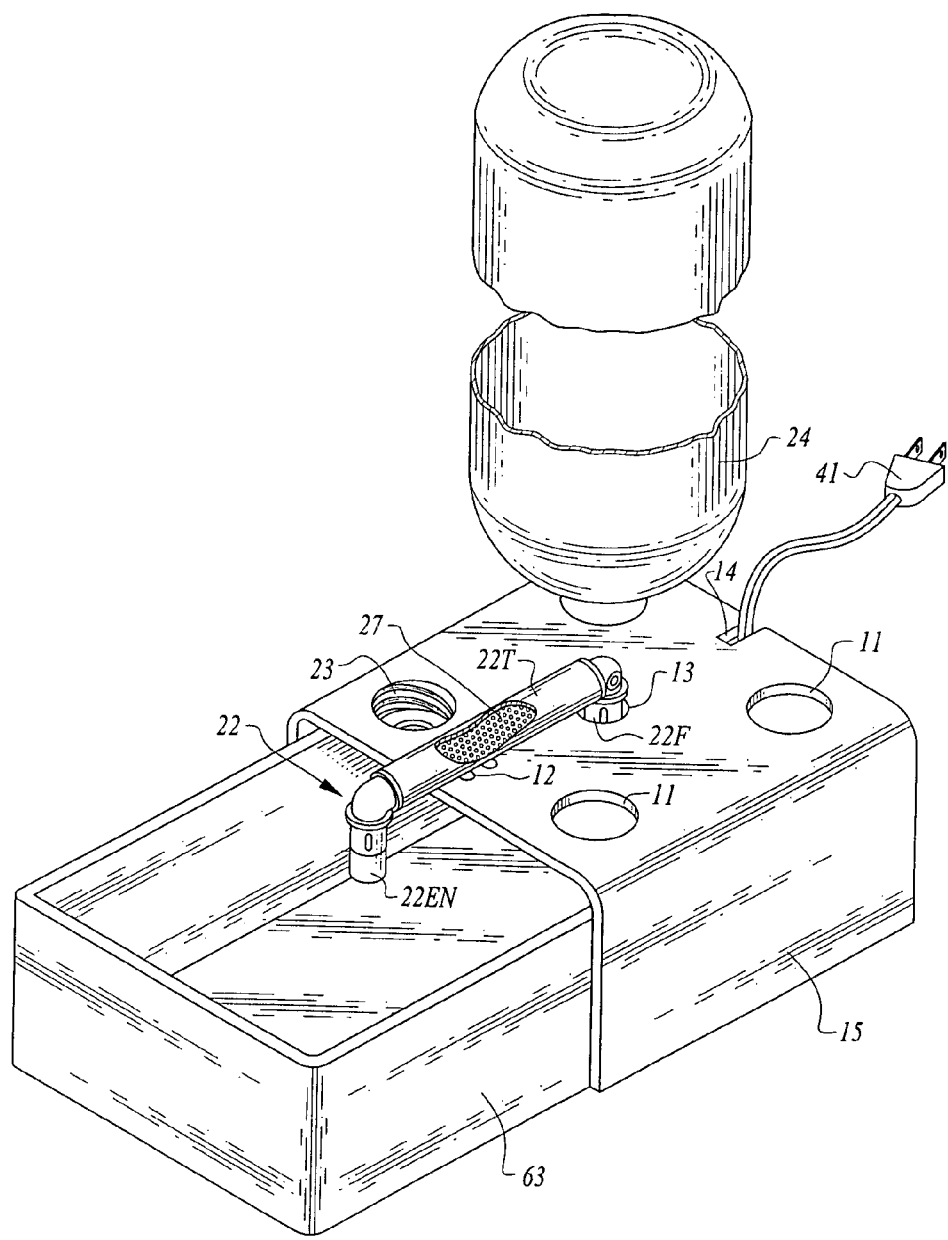
FIG. 5 is a perspective view of the inverted platform, and the vessel used therewith disposed beneath the platform, plus the syphon and a refill bottle.

FIG. 5 is a view related to FIG. 2. Here two apertures 11 are seen to be unfilled, while the left front aperture has a Yorker closure 23 therein but nothing attached. The left rear aperture has a refill bottle of any capacity, preferably a quart or less threadedly connected to a Yorker closure of the nature previously discussed. Shown retained in notch 14 is cord 41 from the submersible pump disposed within the vessel 53 but not visible from the angle of the viewer as the pump is beneath the platform 15. Charcoal granules 27 are also visible in the siphon 22.

Figure 6:
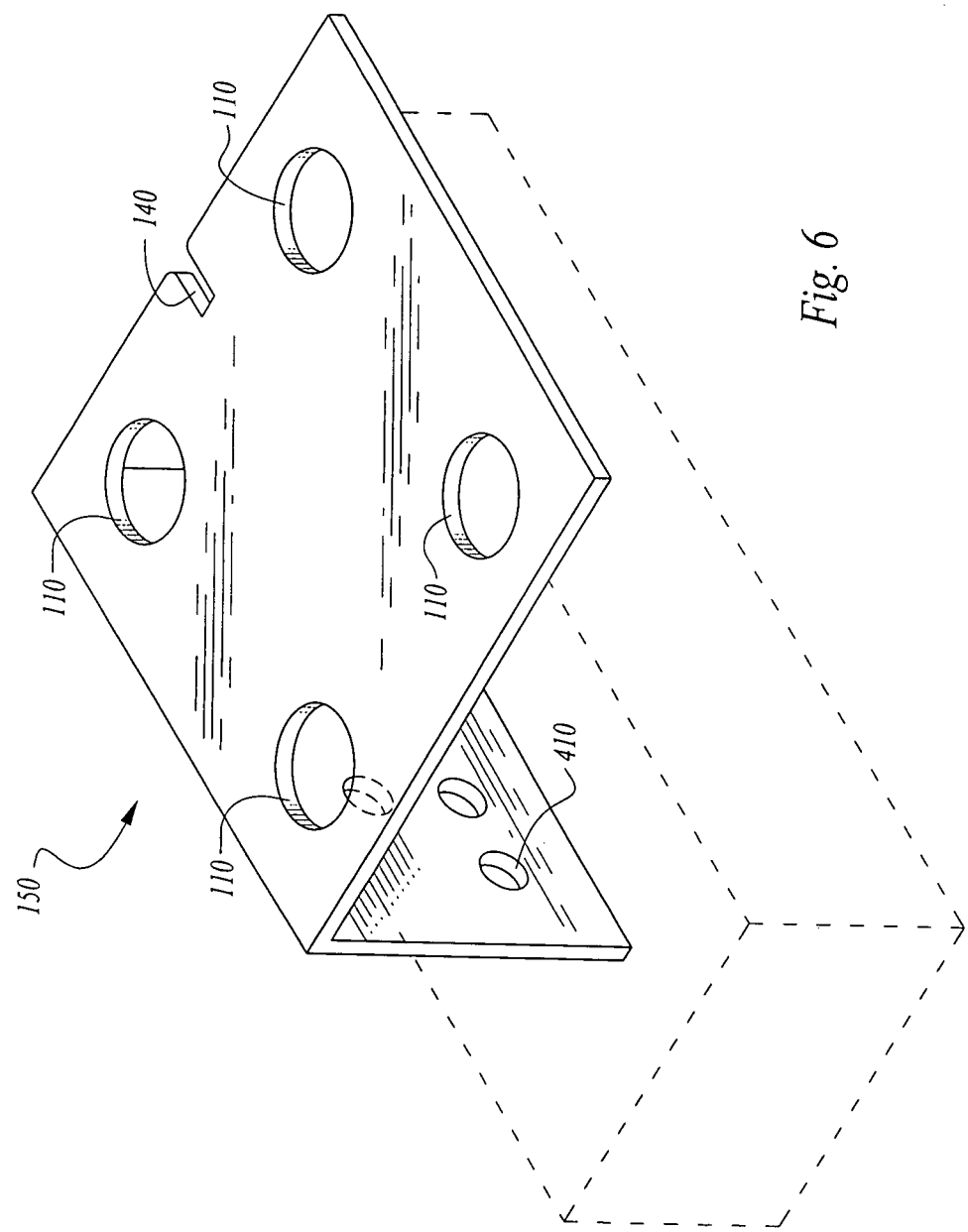
FIG. 6 is a perspective view of a variant of the platform designed to be wall mounted.

The discussion now moves to FIG. 6. This is a tilted L-shaped platform 150 which has a base or top and just one leg, while overhanging a vessel (shown in phantom lines,) is intended to be attached to a wall (not shown) for its support. Again, 4 apertures in number are present designated 110, & the notch is 140. Two side by side mounting holes 410 spaced slightly away from said vessel, are utilized for suitable screws for mounting of the platform 150 to a wood or gypsum board wall. The use of the platform 150 and its ability to hold various components need not be discussed further as the components are the same as those previously discussed at length.

Figure 7:
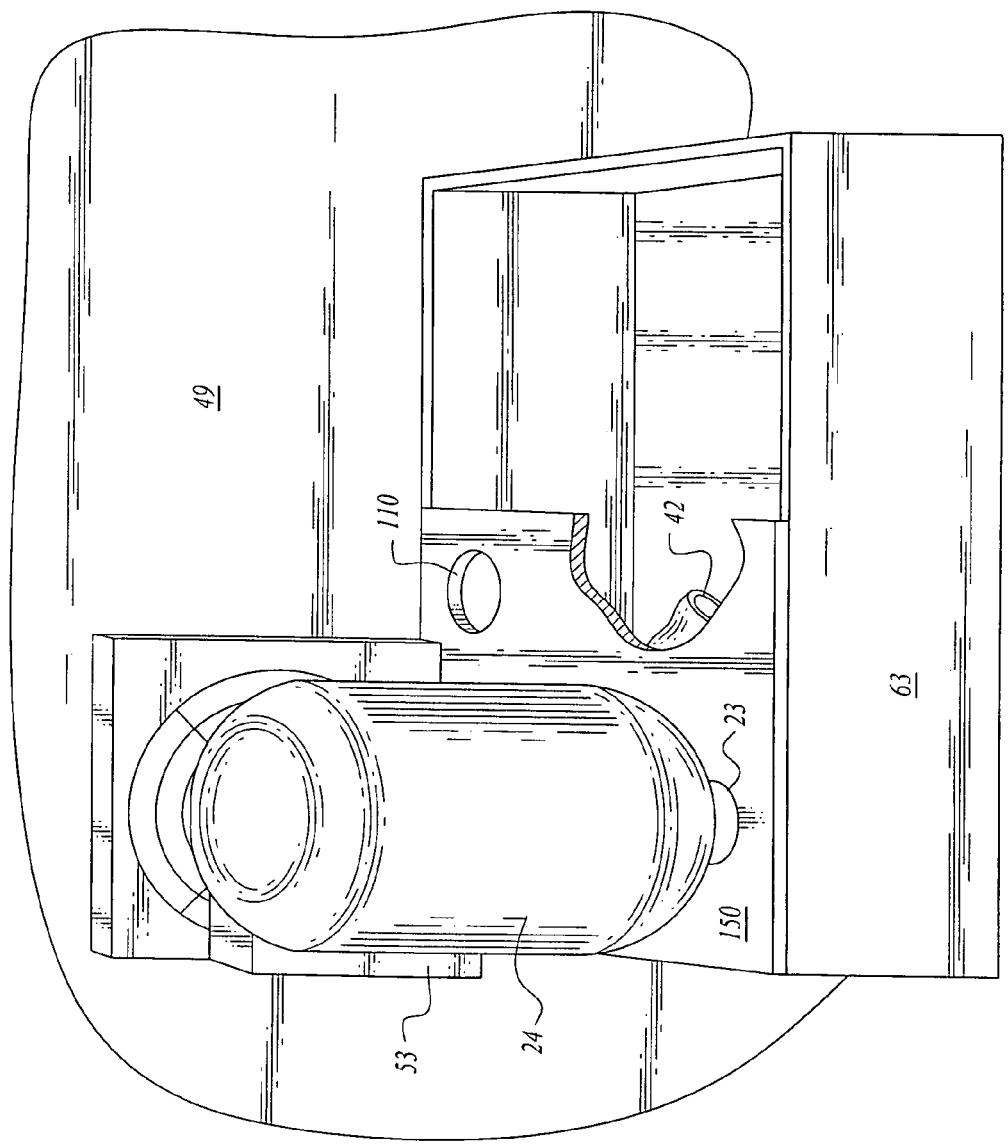
FIG. 7 is a top perspective view of the variant platform attached to a cabinet and also showing an inverted water bottle on the platform as well as a prior art chiller disposed partially on the platform and partially in the water vessel disposed beneath the platform.

In FIG. 7 variant platform 150 is seen disposed over vessel 53 spaced closely therefrom. Aperture 110 is seen as being empty, and one aperture has been removed due to the cutaway view to show the intake 42 of the pump 40 disposed beneath platform 150. Chiller 20 is seen disposed in the rear left aperture and a clear bottle, to avoid problems is shown disposed on a closure 23 in the left front aperture. The platform is seen to be mounted on wall 49.

FIG. 8 is a view related to FIG. 7 in that the variant platform 150 is seen mounted by screws 61 to the wall 49. Vessel 53 has been cutaway along its end wall to show the presence of a submersible pump, 40, such as model SP70 made by Danner Manufacturing, Inc of Islandia., N.Y. or one by Little Giant®, or the Rio 4HF among suitable pumps that may be employed. The entry port 42, the exit port 43 and the interposed connection tube 44 between the siphon and the exit port are also seen. For the sake of not cluttering up the drawing, the refill bottle and other accessories have been omitted in this view.

From this view one can understand the continuous recycle of water through the filter medium in the siphon.

While the platforms depicted herein both have four apertures it is within the scope of this invention to have platforms that have but two apertures or up to 6 apertures plus the central siphon. I prefer to utilize a high fired ceramic vessel instead of plastic, due to the lack of porosity of the high fired ceramic material and as such will not support the growth of biofilm. Also ceramic stays cooler than plastic in warm weather.

The siphon portion can be of any length that extends past the edge of the platform that has no leg, yet is not too long as to interfere with the drinking animal.

It is seen that I have developed a unique pet watering fountain that can be easily refilled without splashing, thus not causing cats to shy away from the apparatus. The presence of the siphon helps keep the water clean, while the chill maintains the temperature that cats desire. While originally developed for cats, small and large dogs alike have been found to enjoy this apparatus.

While it is primarily intended as a water source for cats, other liquids such as liquid medicines either in conjunction with the water supply can be delivered to the cat in this apparatus.

While only one refill bottle is shown in the drawing figures, it is within the scope of the invention to employ 2 or more refill bottles, especially fo hot weather areas such as Palm Desert Calif. and Phoenix Ariz. It is also to be noted that while the pump is shown disposed within the vessel in one of the Figures, it need not be submersible. Only the input need be in the vessel and the output connected to the input elbow of the siphon filter.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. A pet watering apparatus, which can be refilled, as water is removed by evaporation or by a thirsty animal, comprising: a vessel, overlaid by a platform which platform comprises a base having at least 2 apertures therein of a first size and a central smaller aperture therein and at least one leg;
a bottle capable of holding water disposed in one aperture of the first size in an inverted position, having a modified cap and spout closure comprising a tapered spout with a discharge opening at the narrower end of the spout; said spout closure having been cut off at about a 45 degree angle;
further including a siphon tube filter having filter media therein, which siphon filter has elbows at each end, one of which elbows is disposed through the central aperture of the platform into the vessel and a
recirculating pump having an inlet and an outlet, its inlet being in the vessel and its outlet connected to the elbow disposed through the platform and
wherein the other elbow of said siphon filter extends beyond the platform into the vessel; wherein when including water in said vessel, at a predetermined level, and water in said bottle the vessel can be automatically refilled to an original present level by water from the bottle.

2. The apparatus of claim 1 further including a thermo-electric chiller disposed in part through one of the apertures on the platform into the vessel.

3. The apparatus of claim 1 wherein the platform has four apertures, one in each corner on the base, and the platform is an inverted U in configuration and thus has two legs connected to the base.

4. The apparatus of claim 3 wherein a second refill bottle with a modified spout closure is disposed in another aperture on said platform.

5. The apparatus of claim 1 wherein the platform is a tilted L configuration, and comprises a base with but one leg, said leg including mounting holes therein for attachment to a vertical surface.

6. The apparatus of claim 1 wherein the pump is submergible and is disposed in the vessel.

7. A pet watering apparatus which can be refilled as water is removed by evaporation or by a thirsty animal, comprising: a vessel, overlaid by a platform which platform comprises a base having at least 2 apertures therein of a first size and a central smaller aperture
therein; a bottle capable of holding water disposed in one aperture of the first size in an inverted position, having a modified cap and spout closure comprising a tapered spout with a discharge opening at the narrower end of the spout; said spout closure having been cut off at about a 45 degree angle;
and
further including a siphon tube filter having filter media therein, which siphon tube filter has elbows at each end, one of which elbows is disposed through the central aperture of the platform into the vessel and a
recirculating pump having its inlet in the vessel and its outlet connected to the elbow disposed through the platform and wherein the other elbow of said siphon filter extends beyond the platform into the vessel;
still further including a thermo-electric chiller disposed in part through one of the apertures on the platform into the vessel; wherein when including water in said vessel, at a predetermined level, and water in said bottle the vessel can be automatically refilled to an original present level by water from the bottle.

8. The apparatus of claim 7 wherein the platform is an inverted U in configuration, thus having a base and two opposed and spaced legs, said platform having 4 apertures therein, one at each corner.

9. The apparatus of claim 8 further including a notch in one end of the platform not having a leg, and having a retainer for a siphon disposed at the opposite end of the platform where no leg is present.

10. The apparatus of claim 8, wherein the platform is plastic and the vessel is ceramic.

11. The apparatus of claim 7 wherein the platform is a tilted L in configuration, thus having a base and one leg, said platform having 4 apertures in the base, one at each corner, said platform being adapted for wall mounting via two spaced mounting holes in the leg.

12. The apparatus of claim 11, wherein the platform is plastic and the vessel is ceramic.

13. A pet watering apparatus which can be refilled as water is removed by evaporation or by a thirsty animal, comprising: a ceramic vessel, overlaid by an plastic platform which platform comprises a base having at least 2 apertures therein of a first size and a central smaller aperture
therein; a bottle capable of holding water disposed in one aperture of the first size in an inverted position, having a modified cap and spout closure comprising a tapered spout with a discharge opening at the narrower end of the spout; said spout closure having been cut off at about a 45 degree angle;
and
further including a siphon tube filter having filter media therein, which siphon filter has elbows at each end, one of which elbows is disposed through the central aperture of the platform into the vessel and a
recirculating pump having its inlet in the vessel and its outlet connected to the elbow disposed through the platform and wherein the other elbow of said siphon filter extends beyond the platform into the vessel;
still further including a thermo-electric chiller disposed in part through one of the apertures on the platform into the vessel,
wherein the platform is an inverted U in configuration, thus having a base and two spaced and opposed legs; wherein when including water in said vessel, at a predetermined level, and water in said bottle the vessel can be automatically refilled to an original present level by water from the bottle.

14. The pet watering apparatus of claim 13 further including water in said vessel at a predetermined level, and water in said bottle whereby when the animal drinks water from the vessel, the vessel is automatically refilled to the original preset level by water from the bottle.

15. A pet watering apparatus which can be refilled as water is removed by evaporation or by a thirsty animal, comprising: a ceramic vessel, overlaid by an plastic platform which platform comprises a base having at least 4 apertures therein of a first size and a central smaller aperture therein; a bottle capable of holding water disposed in one aperture of the first size in an inverted position, having a modified cap and spout closure comprising a tapered spout with a discharge opening at the narrower end of the spout; said spout closure having been cut off at about a 45 degree angle;

and further including a siphon tube filter having filter media therein, which siphon filter has elbows at each end, one of which elbows is disposed through the central aperture of the platform into the vessel and a recirculating pump having its inlet in the vessel and its outlet connected to the elbow disposed through the platform and wherein the other elbow of said siphon filter extends beyond the platform into the vessel;

wherein the platform is an inverted U in configuration , thus having a base and two legs, said platform having 4 apertures therein of the first size, one at each corner; wherein when including water in said vessel, at a predetermined level, and water in said bottle the vessel can be automatically refilled to an original present level by water from the bottle.

\* \* \* \* \*